(12) United States Patent
van Wouw

(10) Patent No.: US 7,163,460 B2
(45) Date of Patent: Jan. 16, 2007

(54) ENGINE TO TRANSMISSION COUPLER

(75) Inventor: Rob van Wouw, Cary, NC (US)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 10/778,823

(22) Filed: Feb. 13, 2004

(65) Prior Publication Data
US 2005/0181881 A1    Aug. 18, 2005

(51) Int. Cl.
F16D 3/68    (2006.01)

(52) U.S. Cl. .................................... 464/93; 180/908

(58) Field of Classification Search .................. 464/92, 464/93, 98; 180/381, 383, 908; 74/574.4
See application file for complete search history.

(56) References Cited

U.S. PATENT DOCUMENTS 3,059,453 A    10/1962  Codlin
4,092,837 A     6/1978  Gebauer
5,888,139 A *   3/1999  Hoshino ..................... 464/98
5,931,052 A     8/1999  Zhao et al.
2002/0043057 A1  4/2002  Shiba et al.

FOREIGN PATENT DOCUMENTS

DE    3834919 A1    4/1990

* cited by examiner

Primary Examiner—Greg Binda

(57) ABSTRACT

An engine to transmission coupler includes an isolator that dampens, reduces or eliminates torque spikes and vibrations transmitted to the transmission. The isolator is located between the flywheel and a flywheel adaptor plate mounted to the flywheel. A universal joint assembly extends through central openings in the flywheel adaptor plate and isolator.

19 Claims, 5 Drawing Sheets

ENGINE TO TRANSMISSION COUPLER

FIELD OF THE INVENTION

The present invention relates generally to engine to transmission couplers for drive trains of small motor vehicles such as riding lawn mowers, all terrain vehicles and utility vehicles. More specifically, the invention relates to engine to transmission couplers that help isolate and dampen torque spikes and vibrations between a crankshaft and transmission of such vehicles.

BACKGROUND OF THE INVENTION

Small motor vehicle drive trains may include a crankshaft, a flywheel mounted to the crankshaft, and a transmission. The transmission may be coupled to the crankshaft through one or more universal joints to allow for angular misalignment of the crankshaft with respect to the transmission, especially during vehicle operation.

Forces of firing pistons in an internal combustion engine may be transmitted to the crankshaft. The flywheel, by its inertia, helps reduce torque spikes and vibrations that may be transmitted to the transmission. However, there also is a need for an isolator in a coupling between the crankshaft and transmission to dampen, reduce or eliminate torque spikes and vibrations to the transmission and prevent damage to transmission components.

An isolator may be placed in series with one or more universal joints in a coupling between a crankshaft and transmission. The isolator may include elastomeric material such as rubber that may yield resiliently in response to torque spikes, vibrations and similar loads.

In small motor vehicles, such as riding lawn mowers, all terrain vehicles and utility vehicles, it may be desirable to reduce the coupling length between the crankshaft and transmission, and thereby help reduce the length, size and/or weight of the vehicle drive train. An engine to transmission coupler is needed that will allow for angular misalignment of the engine crankshaft relative to the transmission. A shortened engine to transmission coupler is needed with an isolator to dampen, reduce or eliminate torque spikes and vibrations to the transmission.

SUMMARY OF THE INVENTION

A shortened engine to transmission coupler is provided that includes an isolator to dampen, reduce, or eliminate torque spikes and vibrations to the transmission. The coupler will allow for angular misalignment of the engine crankshaft relative to the transmission. The coupler helps reduce the length, size and weight of drive trains for small motor vehicles such as riding lawn mowers, all terrain vehicles and utility vehicles.

A ring-shaped isolator is positioned between the flywheel and a flywheel adaptor plate. The flywheel adaptor plate is mounted to the flywheel, and at least part of the flywheel adaptor plate is spaced from the flywheel. For example, the flywheel adaptor plate may have a central hub spaced from the flywheel, and the isolator may be located and enclosed in the central hub. A universal joint assembly including one or more universal joints may extend through central openings in the isolator and the flywheel adaptor plate.

DESCRIPTION OF THE PREFERRED EMBODIMENT

Figure 1:
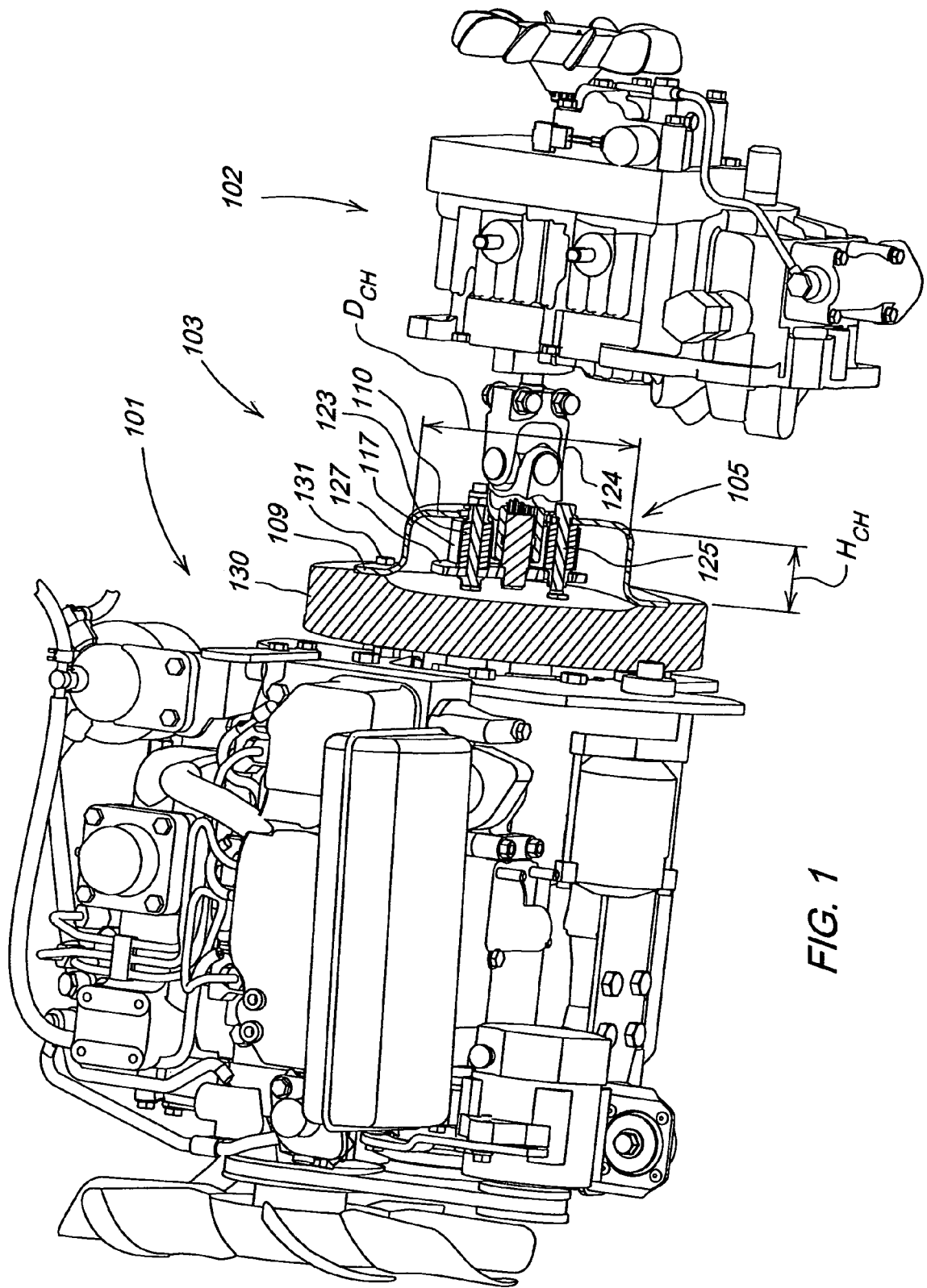
FIG. 1 is a perspective view of a small motor vehicle engine, transmission, and engine to transmission coupler according to one embodiment of the invention.

In one embodiment of the invention, as shown in FIG. 1, a small motor vehicle drive train may include engine 101, transmission 102, and engine to transmission coupler 103. For example, the engine may be an internal combustion engine having a crankshaft with a first generally longitudinal axis, and a flywheel mounted to the crankshaft. The transmission may have a second generally longitudinal axis that may be angularly misaligned from the first longitudinal axis upon assembly and/or during operation. The transmission may be connected to one or more axles and/or drive wheels. The engine to transmission coupler may include one or more universal joints to allow for angular misalignment between the engine crankshaft and transmission.

Figure 2:
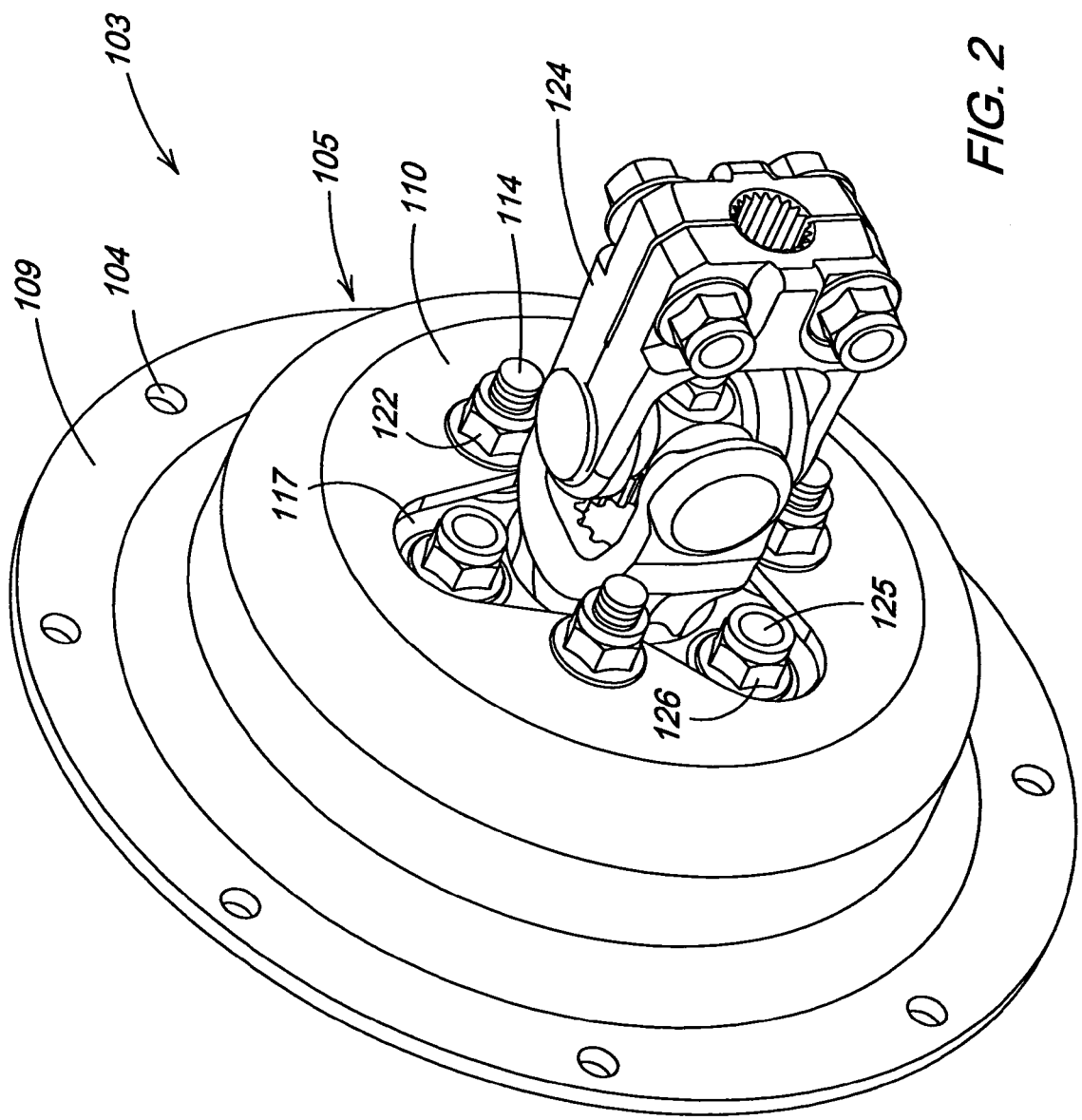
FIG. 2 is a rear perspective view of a first embodiment of an engine to transmission coupler.
Figure 3:
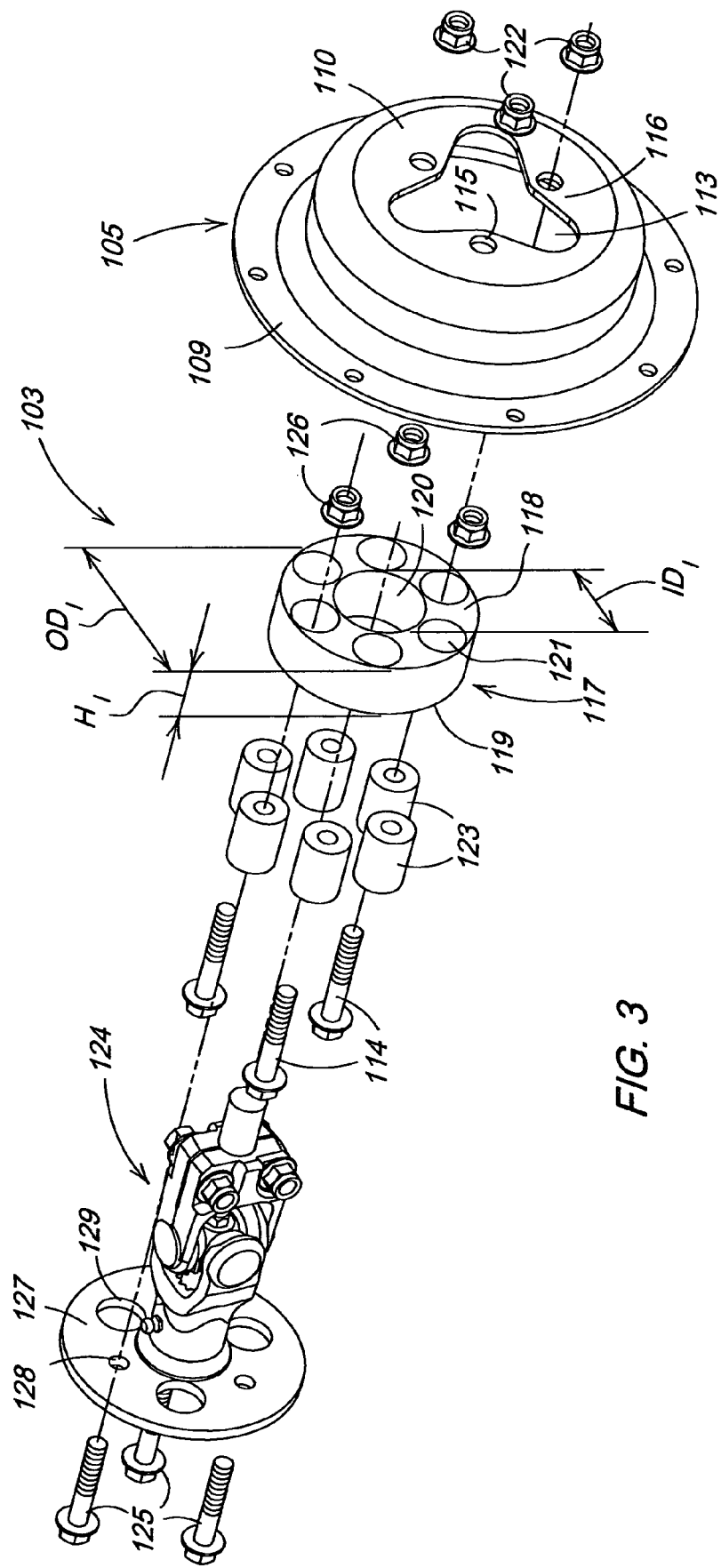
FIG. 3 is an exploded perspective view of the engine to transmission coupler of FIG. 2.

FIGS. 1, 2 and 3 show engine to transmission coupler 103 in a first embodiment having one universal joint. Flywheel adaptor plate 105 may be mounted to engine flywheel 130. In one embodiment, the flywheel adaptor plate may be mounted to a flywheel by threaded fasteners 131 inserted through mounting holes 104 through outer rim 109 of the flywheel adaptor plate and corresponding mounting holes near the perimeter of the flywheel.

When the flywheel adaptor plate is mounted to the flywheel, the flywheel adaptor plate may have a first surface spaced from the flywheel. In one embodiment, the first surface spaced from the flywheel may be central hub 110. Additionally, central opening 113 may extend through the central hub. In one embodiment, the flywheel adaptor plate may have a thickness of about 4.55 mm.

In one embodiment, the first surface of the flywheel adaptor plate that is spaced from the flywheel may be a dish-shaped or concave central hub. Isolator 117 may be positioned and enclosed within the dish-shaped or concave central hub, so that the isolator is between the flywheel adaptor plate and flywheel. The isolator may be a generally ring-shaped member preferably made from rubber, or including a rubber or other resilient and/or elastomeric component capable of yielding elastically sufficiently to dampen, reduce or eliminate high torque spikes and vibrations that might otherwise damage transmission components.

To connect the isolator to the flywheel adaptor plate, according to one embodiment, central opening 113 may have one or more inwardly extending lobes 116. Threaded fasteners 114 may be inserted through mounting holes 115 in lobes 116, through corresponding holes 121 from the first face 118 through to the second face 119 of the isolator, and tightened onto nuts 122. In one embodiment, threaded fasteners connecting the isolator to the flywheel adaptor plate may be inserted into three of the six holes through the isolator.

In one embodiment, sleeves 123 may be positioned in holes 121 through the isolator. The sleeves may be bonded to the holes in the isolator. Threaded fasteners may be inserted through the sleeves. The sleeves may be the same length, or slightly longer or shorter than holes 121, if desired. For example, the sleeves may be 35 mm in length and the holes may be 31.75 mm in length.

To connect the isolator to the transmission, according to one embodiment, universal joint assembly 124 may have a flange 127 at a first end thereof. Threaded fasteners 125 may be inserted through mounting holes 128 in flange 127, through corresponding holes 121 in the isolator, and tightened onto nuts 126. In one embodiment, threaded fasteners 125 connecting the isolator to the universal joint assembly may be inserted through three of the six holes through the isolator.

The first surface of the flywheel adaptor plate should be spaced from the flywheel sufficiently to provide adequate clearance for angular displacement of isolator 117 and flange 127, both of which may be positioned between the flywheel adaptor plate and the flywheel.

For example, in the first embodiment, the height of the isolator $H_I$ (i.e., measured from first face 118 to second face 119) together with the flange may be less than the internal height of the central hub $H_{CH}$. Additionally, the outer diameter of the isolator $OD_I$ and flange may be less than the internal diameter $D_{CH}$ of the central hub. In one embodiment, the height of the isolator $H_I$ may be about 31 mm, the outer diameter $OD_I$ may be about 132 mm, and the inner diameter $ID_I$ may be about 70 mm.

The universal joint assembly may include one or more universal joints that may be interconnected in a manner known to those skilled in the art. When the isolator is connected to flange 127, universal joint assembly 124 may extend through central opening 120 in the isolator and central opening 113 in the flywheel adaptor plate. Flange 127 also may include apertures 129 for adequate clearance of threaded fasteners 114 and nuts 122.

The isolator has a first face 118 and a second face 119. The first face of the isolator, facing transmission 102 and universal joint assembly 124, abuts and may be connected to the inside of the central hub of the flywheel adaptor plate. The second face of the isolator, facing engine 101 and the engine flywheel, abuts and is connected to flange 127 of the universal joint assembly.

Figure 4:
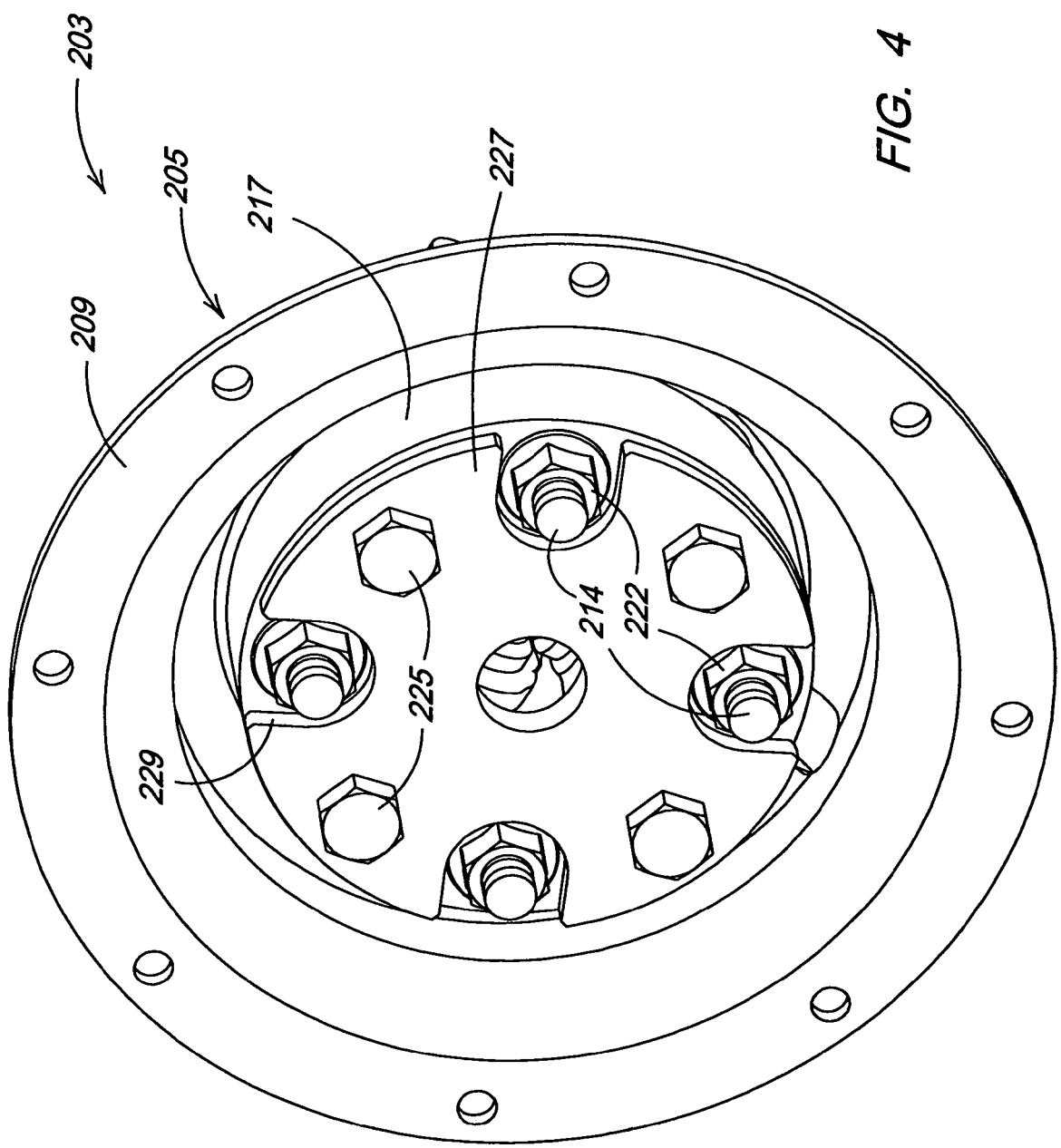
FIG. 4 is a front perspective view of a second embodiment of an engine to transmission coupler.
Figure 5:
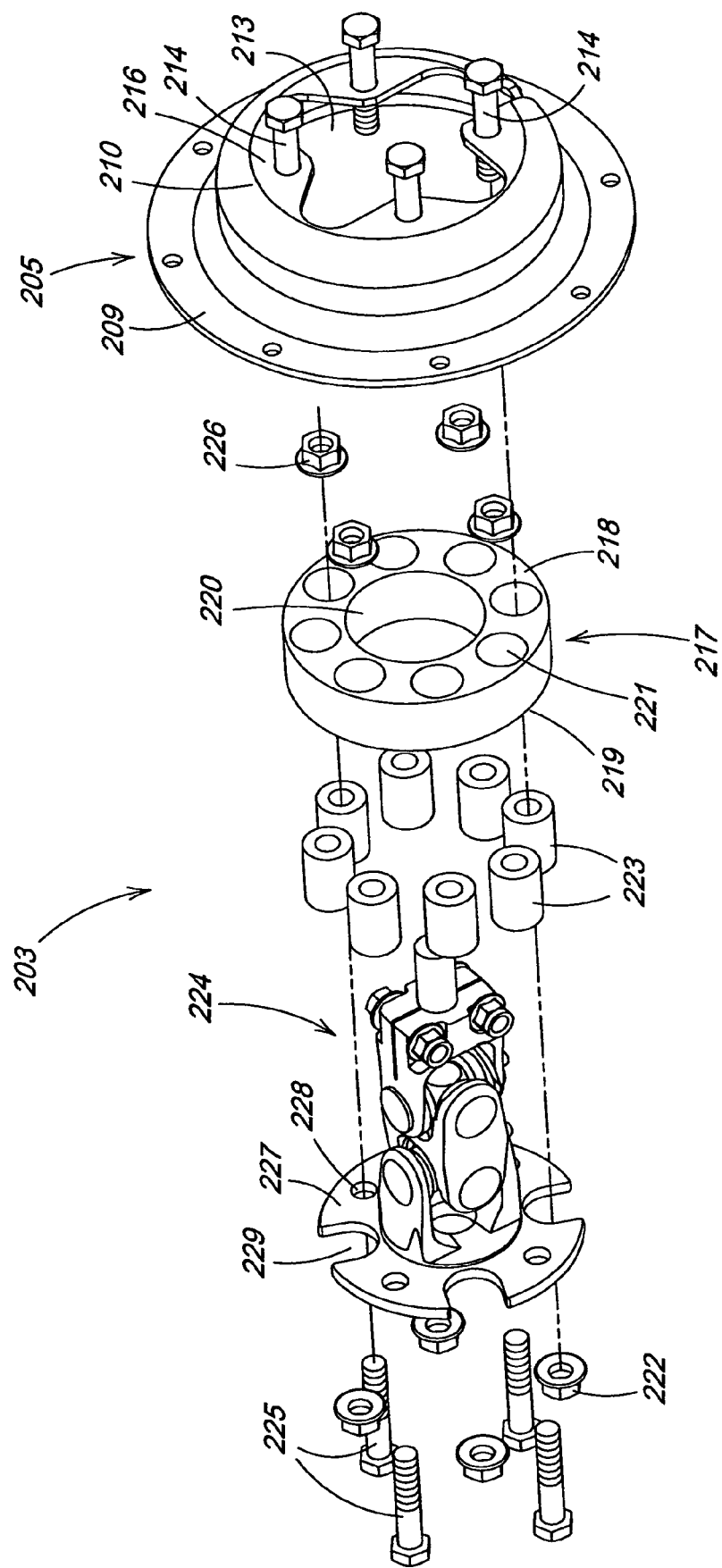
FIG. 5 is an exploded perspective view of the engine to transmission coupler of FIG. 4.

In FIGS. 4 and 5, a second embodiment is shown in which engine to transmission coupler 203 may include two universal joints. Flywheel adaptor plate 205 may be mounted to an engine flywheel by threaded fasteners (not shown) through the perimeter of the flywheel and through mounting holes in rim 209. Isolator 217 may be positioned between the flywheel adaptor plate and the flywheel. For example, the isolator may be enclosed within central hub 210 of the flywheel adaptor plate.

Isolator 217 may have a first face 218, a second face 219, a central opening 220, and holes 221 from the first face to the second face. The first face of the isolator may abut and be connected to the flywheel adaptor plate by threaded fasteners 214 inserted through mounting holes in lobes 216, holes 221 through the isolator, and tightened onto nuts 222. The second face of the isolator may abut and be connected to universal joint assembly 224 by threaded fasteners 225 inserted through mounting holes 228 in flange 227, holes 221 through the isolator, and tightened onto nuts 226. Preferably, holes 221 may be equally divided into those receiving threaded fasteners connecting the isolator to the flywheel adaptor plate, and those receiving threaded fasteners connecting the isolator to the flange of the universal joint assembly. Optionally, sleeves 223 may be positioned in and/or bonded to holes 221.

When a second embodiment of the engine to transmission coupler is assembled, universal joint assembly 224 may extend through central opening 220 in the isolator and central opening 213 in the flywheel adaptor plate. Flange 227 may include openings sufficient to provide adequate clearance for threaded fasteners 214 and nuts 222.

The central hub may be dimensioned to provide sufficient clearance for angular displacement of isolator 217 and flange 227, both of which are positioned between the flywheel adaptor plate and the flywheel. Thus, in the second embodiment, the combined height and diameter of the isolator and flange may be less than the internal height and diameter of the central hub.

In a third embodiment, a flywheel adaptor plate may be a generally ring-shaped flat surface that is spaced from the flywheel. In this embodiment, the flywheel adaptor plate may be attached to the flywheel by threaded fasteners and spacers. The isolator may be positioned between the generally ring-shaped flat flywheel adaptor plate and the flywheel, but not enclosed.

Isolators of the type used in the described embodiments are available from Lord Corporation of Cary, N.C. For example, model nos. LCR 400-800-060A and LCR 300-600-028A may be used in these embodiments.

Having described the preferred embodiment, it will become apparent that various modifications can be made without departing from the scope of the invention as defined in the accompanying claims.

The invention claimed is:

1. An engine to transmission coupler comprising:
    a flywheel adaptor plate mounted to a flywheel, the flywheel adaptor plate having a central hub with an internal height and a first surface that is dish-shaped and spaced from the flywheel;
    a universal joint assembly having a flange at an end thereof; and
    a ring-shaped isolator positioned within the central hub between the flywheel adaptor plate and the flywheel, the isolator having a first face abutting and connecting to the first surface of the flywheel adaptor plate and a second face abutting and connecting to the universal joint assembly flange, the isolator having a height between the first face and the second face that is less than the internal height of the central hub.

2. The apparatus of claim 1 wherein the universal joint assembly comprises a plurality of universal joints.

3. The engine to transmission coupler of claim 1 further comprising a plurality of holes through the isolator from the first face to the second face thereof.

4. The engine to transmission coupler of claim 3 further comprising a plurality of sleeves positioned in the holes.

5. The engine to transmission coupler of claim 3 further comprising a plurality of threaded fasteners inserted through the holes and connecting the isolator to the flywheel adaptor plate.

6. The engine to transmission coupler of claim 3 further comprising a plurality of threaded fasteners inserted through the holes and connecting the isolator to the universal joint assembly.

7. The engine to transmission coupler of claim 1 wherein the flywheel adaptor plate has a central opening with a plurality of inwardly extending lobes.

8. The engine to transmission coupler of claim 7 further comprising a plurality of fasteners between the isolator and the inwardly extending lobes.

9. The engine to transmission coupler of claim 1 wherein the isolator is rubber.

10. An engine to transmission coupler comprising:
an isolator positioned between an engine flywheel and a universal joint assembly, the isolator having a first face facing away from the engine flywheel and a second face facing the engine flywheel;
a flywheel adaptor plate mounted to the engine flywheel;
the isolator positioned within the flywheel adaptor plate such that the first face of the isolator facing abuts and connects to the flywheel adaptor plate and the second face of the isolator abuts and connects to the universal joint assembly.

11. The engine to transmission coupler of claim 10 wherein the isolator is a ring-shaped rubber body.

12. The engine to transmission coupler of claim 10 wherein the universal joint assembly further comprises a first end having a flange.

13. The engine to transmission coupler of claim 12 wherein the second face of the isolator is abutting and connecting to the flange.

14. The engine to transmission coupler of claim 10 further comprising a plurality of holes through the isolator and a plurality of threaded fasteners extending through the holes.

15. The engine to transmission coupler of claim 10 wherein the flywheel adaptor plate has a concave central hub.

16. An engine to transmission coupler comprising:
a flywheel adaptor plate mounted with threaded fasteners to a flywheel, the flywheel adaptor plate having a central hub with a first surface spaced from the flywheel; and
a rubber isolator within the central hub between the first surface and the flywheel, the rubber isolator having a first face abutting and connected to the first surface of the flywheel adaptor plate and a second face connected to a universal joint assembly.

17. The engine to transmission coupler of claim 16 further comprising a central opening in the flywheel adaptor plate, the universal joint assembly extending through the central opening.

18. The engine to transmission coupler of claim 16 wherein the isolator comprises a central opening, the universal joint assembly extending through the central opening.

19. The engine to transmission coupler of claim 16 further comprising a flange at a first end of the universal joint assembly, and wherein the flywheel adaptor plate has an internal height greater than the height of the rubber isolator.

* * * * *